US011195310B2

(12) United States Patent
Fu et al.

(10) Patent No.: US 11,195,310 B2
(45) Date of Patent: Dec. 7, 2021

(54) ITERATIVE IMAGE RECONSTRUCTION FRAMEWORK

(71) Applicant: General Electric Company, Schenectady, NY (US)

(72) Inventors: Lin Fu, Niskayuna, NY (US); Sathish Ramani, Niskayuna, NY (US); Jie Tang, New Berlin, WI (US); Bruno Kristiaan Bernard De Man, Clifton Park, NY (US); Jed Douglas Pack, Glenville, NY (US); Jiang Hsieh, Brookfield, WI (US); Ge Wang, Troy, NY (US)

(73) Assignees: GENERAL ELECTRIC COMPANY, Schenectady, NY (US); RENSSELAER POLYTECHNIC INSTITUTE, Troy, NY (US)

( * ) Notice: Subject to any disclaimer, the term of this patent is extended or adjusted under 35 U.S.C. 154(b) by 133 days.

(21) Appl. No.: 16/056,111

(22) Filed: Aug. 6, 2018

(65) Prior Publication Data
US 2020/0043204 A1 Feb. 6, 2020

(51) Int. Cl.
*G06T 11/00* (2006.01)
*G06N 3/04* (2006.01)
(Continued)

(52) U.S. Cl.
CPC .......... *G06T 11/006* (2013.01); *G06N 3/0454* (2013.01); *G06N 3/084* (2013.01);
(Continued)

(58) Field of Classification Search
CPC ..... G06T 2207/10081; G06T 2211/424; G06T 5/002; G06T 5/50; G06T 11/005; G06T 2207/20084; G06T 11/008; G06T 2207/10104; G06T 2207/20081; G06T 7/0012; G06T 11/003; G06T 15/06;
(Continued)

(56) References Cited

U.S. PATENT DOCUMENTS 6,507,633 B1  1/2003  Elbakri et al.
2008/0260232 A1*  10/2008  Ohara ............... A61B 6/484
                                         382/132
(Continued)

FOREIGN PATENT DOCUMENTS

CN  107403419 A   11/2017
WO  2017223560 A1 12/2017

OTHER PUBLICATIONS

Nuyts, Johan, et al.; "Modelling the physics in the iterative reconstruction for transmission computed tomography", Physics in Medicine and Biology, vol. 58, pp. R63-R96, Jun. 5, 2013.
(Continued)

*Primary Examiner* — Golam Sorowar

(57) ABSTRACT

The present disclosure relates to image reconstruction with favorable properties in terms of noise reduction, spatial resolution, detail preservation and computational complexity. The disclosed techniques may include some or all of: a first-pass reconstruction, a simplified datafit term, and/or a deep learning denoiser. In various implementations, the disclosed technique is portable to different CT platforms, such as by incorporating a first-pass reconstruction step.

12 Claims, 13 Drawing Sheets

(51) Int. Cl.
  *G06N 3/08* (2006.01)
  *G06T 5/00* (2006.01)
(52) U.S. Cl.
  CPC ........ *G06T 5/002* (2013.01); *G06T 2211/421* (2013.01); *G06T 2211/424* (2013.01)
(58) Field of Classification Search
  CPC . G06T 2207/10108; G06T 2207/20192; G06T 2207/20221; G06T 2207/30004; G06T 2210/41; G06T 2211/408; G06T 2211/412; G06T 11/006; A61B 6/032; A61B 6/5205; A61B 6/5258; A61B 6/037; A61B 6/025; A61B 6/027; A61B 6/03; A61B 6/4258; A61B 6/4417; A61B 6/482; A61B 6/488; A61B 6/5235; A61B 6/5282; A61B 6/5288; A61B 6/545; G06N 3/08; G06N 3/04; G06N 3/0454; G06N 20/00; G06N 3/0472; G06N 3/084; G06N 5/046
  See application file for complete search history.

(56) References Cited

U.S. PATENT DOCUMENTS

| | | |
|---|---|---|
| 2011/0044559 A1 | 2/2011 | Erhard et al. |
| 2014/0185898 A1* | 7/2014 | Park ...................... G06T 11/005 382/131 |
| 2016/0350944 A1* | 12/2016 | Pal ......................... G06T 11/006 |
| 2017/0124730 A1* | 5/2017 | Forman ................. G06T 11/006 |
| 2017/0164911 A1* | 6/2017 | Lv .......................... A61B 6/037 |
| 2018/0018757 A1* | 1/2018 | Suzuki ................. A61B 6/5205 |
| 2018/0174335 A1 | 6/2018 | Tamakawa et al. |
| 2019/0221011 A1* | 7/2019 | Ye ........................... G06T 5/002 |
| 2019/0365341 A1* | 12/2019 | Chan ....................... G06T 5/002 |

OTHER PUBLICATIONS

Yuan, Huizhuo, et al.; "SIPID: A deep learning framework for sinogram interpolation and image denoising in low-dose CT reconstruction", 2018 IEEE 15th International Symposium on Biomedical Imaging (ISBI 2018), pp. 1521-1524, Apr. 4-7, 2018.

European patent application 19188957.5 filed Jul. 29, 2019; European Search Report dated Oct. 15, 2019; 9 pages.

Kim Kyungsang et al: "Penalized PET Reconstruction using CNN Prior", 2017 IEEE NuclearScience Symposium and Medical Imaging Conference (NSS/MIC), IEEE, Oct. 21, 2017 (Oct. 21, 2017), pp. 1-4, XP033445908, DOI: 10.1109/NSSMIC.2017.8532640 [retrievedon Nov. 12, 2018] *abstract* *figure1* *Sections2-Aand2-C*.

Ye Dong Hye et al: "Deep Residual Learning for Model-Based Iterative CT Reconstruction Using Plug-and-Play Framework", 2018 IEEE International Conference on Acoustics, Speech and Signal Processing (ICASSP), IEEE, Apr. 15, 2018 (Apr. 15, 2018), pp. 6668-6672, XPQ33403974, DOI: 10.1109/ICASSP.2018. 8461408 [retrievedon Sep. 10, 2018] *abstract* *Section2.2*.

* cited by examiner

ITERATIVE IMAGE RECONSTRUCTION FRAMEWORK

TECHNICAL FIELD

The subject matter disclosed herein relates to iterative reconstruction of images using non-invasively acquired scan data.

BACKGROUND

Non-invasive imaging technologies allow images of the internal structures or features of a patient/object to be obtained without performing an invasive procedure on the patient/object. In particular, such non-invasive imaging technologies rely on various physical principles (such as the differential transmission of X-rays through a target volume, the reflection of acoustic waves within the volume, the paramagnetic properties of different tissues and materials within the volume, the breakdown of targeted radionuclides within the body, and so forth) to acquire data and to construct images or otherwise represent the observed internal features of the patient/object.

Reconstruction of images using non-invasively acquired scan data may be performed using various types of reconstruction processes and algorithms. All reconstruction processes and algorithms are subject to various trade-offs, such as between computational efficiency, patient dose, scanning speed, image quality, and artifacts.

By way of example, computed tomography (CT) images may be subject to image noise due to the quantum nature of X-rays and detector readout noise. Such images are limited in terms of spatial resolution by several factors, including the finite focal spot size, the detector cell size, and the reconstruction process. Image noise increases when radiation dose is increased or when the spatial resolution is increased. Hence, it is desirable to minimize image noise and maximize spatial resolution for a given radiation dose. It is also important that the reconstruction process preserves low-contrast details and that the reconstruction process is computationally efficient.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method is provided for reconstructing an image. In accordance with this embodiment, a sinogram input is received. One or more intermediate sinograms is generated from the sinogram input or from one or more intermediate images generated from the sinogram input. The one or more intermediate sinograms is iteratively processed. The iterative processing comprises performing at least an iterative datafit operation comparing an output of an iterative loop with an input to the iterative loop. A denoising operation is performed in addition to the datafit operation. The denoising operation is performed using a trained artificial neural network. Upon completion of the iterative processing, a final image is reconstructed and output for review, storage, or further processing.

In a further embodiment, a method is provided for reconstructing an image. In accordance with this embodiment, a sinogram input is received. An initial reconstruction or multiple partial reconstructions of the sinogram input is performed to generate an intermediate image or multiple intermediate images. The one or more intermediate images or a transform of the one or more intermediate images is iteratively processed. The iterative processing comprises performing at least an iterative datafit operation comparing an output of an iterative loop with an input to the iterative loop. A denoising operation is performed in addition to the datafit operation. The denoising operation is performed using a trained artificial neural network. Upon completion of the iterative processing, a final image is reconstructed and output for review, storage, or further processing.

In an additional embodiment, a method is provided for reconstructing an image. In accordance with this embodiment, a sinogram input is received. A first denoising operation is performed on the sinogram input using a first trained artificial neural network. The sinogram input is reconstructed to generate one or more reconstructed images. A second denoising operation is performed in the image domain using a second trained artificial neural network. Upon completion of the iterative processing, a final image is output for review, storage, or further processing.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
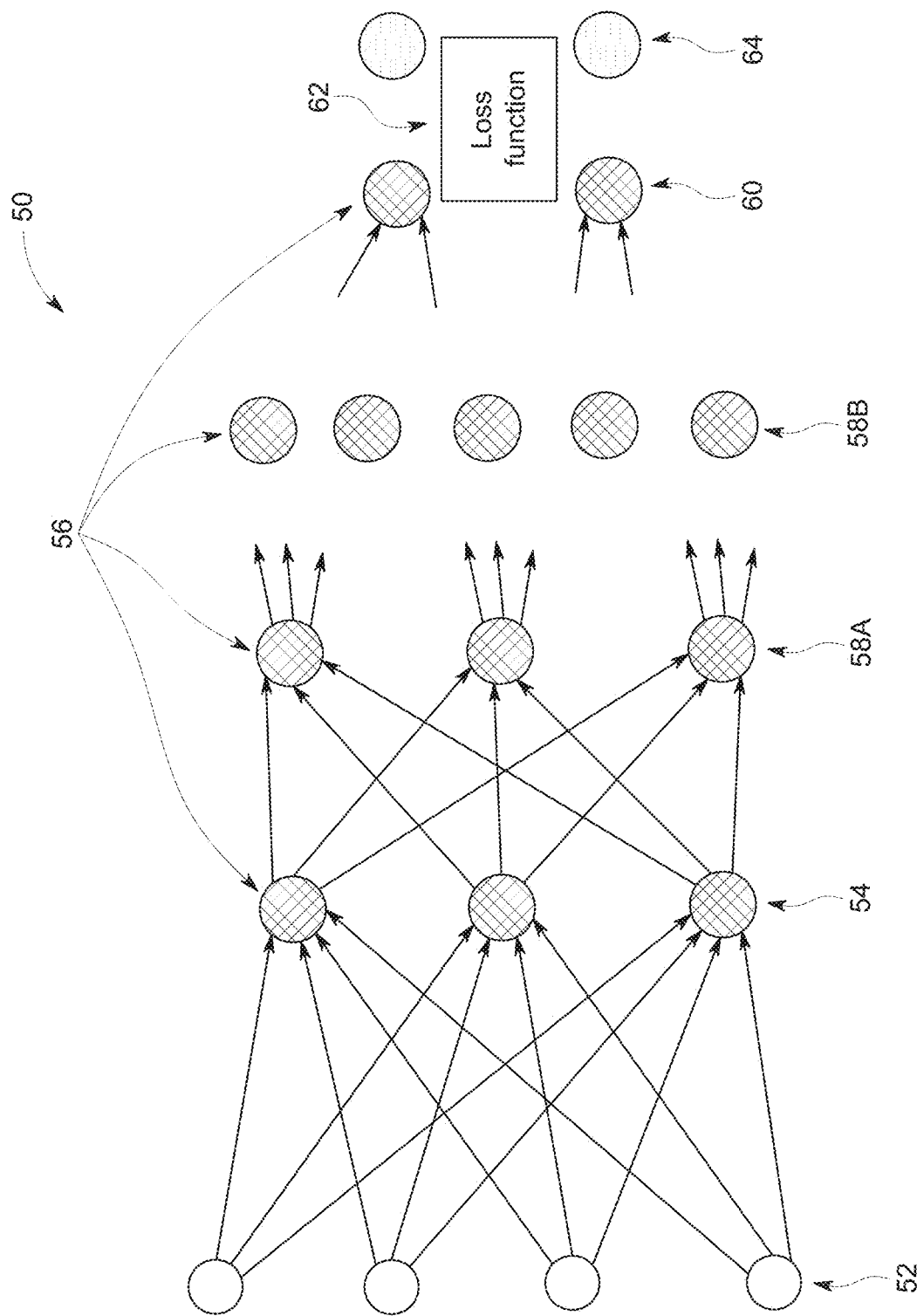
FIG. 1 depicts an example of an artificial neural network for training a deep learning model, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

While aspects of the following discussion are provided in the context of medical imaging, it should be appreciated that the disclosed techniques are not limited to such medical contexts. Indeed, the provision of examples and explanations in such a medical context is only to facilitate explanation by providing instances of real-world implementations and applications. However, the disclosed techniques may also be utilized in other contexts, such as iterative tomographic image reconstruction for industrial Computed Tomography (CT) used in non-destructive inspection of manufactured parts or goods (i.e., quality control or quality review applications), and/or the non-invasive inspection of packages, boxes, luggage, and so forth (i.e., security or screening applications). In general, the present disclosure may be useful in any imaging or screening context or image processing field where a set or type of acquired data undergoes a reconstruction process to generate an image or volume.

Furthermore, while the following discussion focuses on standard images or image volumes, it should be understood that the same approach can also be applied to sets of images or image volumes corresponding to different aspects of the scan. For example, spectral CT produces a set of images, including monochromatic images at different energies as well as basis material decomposition images. Or as another example, dynamic CT or PET produces a set of images at different time points. The current invention may be applied to these sets or types of images as well as others.

Further, though CT and C-arm examples are primarily provided herein, it should be understood that the disclosed technique may be used in other imaging modality contexts where iterative tomographic reconstruction processes are employed. For instance, the presently described approach may also be employed on data acquired by other types of tomographic scanners including, but not limited to, positron emission tomography (PET) scanners, single photon emission computed tomography (SPECT) scanners, and/or magnetic resonance imaging (MRI) scanners.

By way of example, several imaging modalities, such as X-ray CT (e.g., multi-slice CT) and X-ray C-arm systems (e.g., cone-beam CT), measure projections of the object or patient being scanned where the projections, depending on the technique, correspond to Radon transform data, fan-beam transform data, cone-beam transform data, or non-uniform Fourier transforms. In other contexts, the scan data may be emission type data (e.g., PET or SPECT data) or magnetic resonance data (e.g., MM data) generated in response to magnetic fields and RF pulses. Iterative tomographic reconstruction algorithms and related correction and calibration algorithms are employed in conjunction with these imaging modalities to generate useful cross-sectional images or volumetric images from raw measurements.

Conventional reconstruction techniques typically use reconstruction algorithms that can either be characterized as direct reconstruction (which execute an explicit inversion step) or as optimization-based reconstruction (which iteratively optimize a cost function). Direct reconstruction approaches are relatively fast but lack an efficient way to suppress noise and certain artifacts. Optimization-based reconstruction approaches offer improved noise reduction and can incorporate physics effects in the forward model that are not easily inverted analytically, but such approaches are relatively computationally expensive.

As discussed herein, the present disclosure relates to image reconstruction with favorable properties in terms of noise reduction, spatial resolution, detail preservation and computational complexity. The disclosed technique may include some or all of three different aspects: a first-pass reconstruction, a simplified datafit term, and a deep learning denoiser. As used herein, the term "datafit" may be understood to mean the reconstruction cost function term that defines the level of consistency of an estimated solution or set of variables (e.g., a reconstructed image) with the measured data (e.g., a sinogram). For example a datafit term may be the weighted least squares error between the measured sinogram and the reprojection of an estimated reconstructed image. To reduce the computational complexity of the datafit operation or to improve image quality, the "datafit operation" may also define the level of consistency of the estimated solution or set of variables (e.g., a reconstructed image) with a transform of the measured data as discussed herein (e.g., reprojection of an initial reconstruction from the measured data). Hence a "datafit operation" or "datafit update", as used herein, may be understood to refer to an iterative update of an estimated solution, where the iterative update is designed to enhance consistency of the estimated solution with the measured data or indirectly with a transform of the measured data. In accordance with this approach, the simplicity of a direct reconstruction approach may be obtained along with the noise reduction capability of deep learning, with the statistical benefit of a data-fit term. In addition, in various implementations, the present disclosure is easily portable to different CT platforms, such as by incorporating a first-pass reconstruction step, as discussed herein.

With the preceding introductory comments in mind, some generalized information is provided both to indicate general context of the present disclosure and to facilitate understanding and explanation of certain of the technical concepts described herein.

For example, as noted above, deep-learning approaches may be employed with respect to denoising of an image. The deep learning denoising steps discussed herein may include approaches based on a residual network, a generative adversarial network, or another loss network. In certain implementations, such deep-learning approaches may utilize neural networks in this denoising role as part of the reconstruction process used to generate tomographic images, such as CT, PET, SPECT, C-arm, phase-contrast, and MR images. Neural networks as discussed herein may encompass deep neural networks, fully connected networks, convolutional neural networks (CNNs), perceptrons, auto encoders, recurrent networks, wavelet filter banks based neural networks, or other neural network architectures. These techniques are referred to herein as deep learning techniques, though this terminology may also be used specifically in reference to the use of deep neural networks, which is a neural network having a plurality of layers.

As discussed herein, deep learning techniques (which may also be known as deep machine learning, hierarchical learning, or deep structured learning) are a branch of machine learning techniques that employ mathematical representations of data and artificial neural network for learning. By way of example, deep learning approaches may be characterized by their use of one or more algorithms to extract or model high level abstractions of a type of data of interest. This may be accomplished using one or more processing layers, with each layer typically corresponding to a different level of abstraction and, therefore potentially employing or utilizing different aspects of the initial data or outputs of a preceding layer (i.e., a hierarchy or cascade of layers) as the target of the processes or algorithms of a given layer. In an image processing or reconstruction context, this may be characterized as different layers corresponding to the different feature levels or resolution in the data.

In general, the processing from one representation space to the next-level representation space can be considered as one 'stage' of the reconstruction process. Each stage of the reconstruction can be performed by separate neural networks or by different parts of one larger neural network. For example, as discussed herein, a single deep learning network may be used to provide denoising of an image as a step in a reconstruction process.

As discussed herein, as part of the initial training of deep learning processes to solve a particular problem, training data sets may be employed that have known initial values (e.g., input images, projection data, emission data, magnetic resonance data, and so forth) and known or desired values for a final output (e.g., reconstructed tomographic reconstructions, such as de-noised cross-sectional images or volumetric representations) of the deep learning process. The training of a single stage may have known input values corresponding to one representation space and known output values corresponding to a next-level representation space. In this manner, the deep learning algorithms may process (either in a supervised or guided manner or in an unsupervised or unguided manner) the known or training data sets until the mathematical relationships between the initial data and desired output(s) are discerned and/or the mathematical relationships between the inputs and outputs of each layer are discerned and characterized. Similarly, separate validation data sets may be employed in which both the initial and desired target values are known, but only the initial values are supplied to the trained deep learning algorithms, with the outputs then being compared to the outputs of the deep learning algorithm to validate the prior training and/or to prevent over-training.

With the preceding in mind, FIG. 1 schematically depicts an example of an artificial neural network 50 that may be trained as a deep learning model as discussed herein. In this example, the network 50 is multi-layered, with a training input 52 and multiple layers including an input layer 54, hidden layers 58A, 58B, and so forth, and an output layer 60 and the training target 64 present in the network 50. Each layer, in this example, is composed of a plurality of "neurons" or nodes 56. The number of neurons 56 may be constant between layers or, as depicted, may vary from layer to layer. Neurons 56 at each layer generate respective outputs that serve as inputs to the neurons 56 of the next hierarchical layer. In practice, a weighted sum of the inputs with an added bias is computed to "excite" or "activate" each respective neuron of the layers according to an activation function, such as rectified linear unit (ReLU), sigmoid function, hyperbolic tangent function, or otherwise specified or programmed. The outputs of the final layer constitute the network output 60 (e.g., predicted image) which, in conjunction with a target image 64, are used to compute some loss or error function 62, which will be backpropagated to guide the network training.

The loss or error function 62 measures the difference between the network output (i.e., a denoised image) and the training target. In certain implementations, the loss function may be the mean squared error (MSE) of the voxel-level values or partial-line-integral values and/or may account for differences involving other image features, such as image gradients or other image statistics. Alternatively, the loss function 62 could be defined by other metrics associated with the particular task in question, such as a softmax function.

To facilitate explanation of the present tomographic reconstruction approach using deep learning techniques, the present disclosure primarily discusses these approaches in the context of a CT or C-arm system. However, it should be understood that the following discussion may also be applicable to other image modalities and systems including, but not limited to, PET, SPECT, multi-spectral CT, phase-contrast imaging, and MRI, as well as to non-medical contexts or any context where tomographic reconstruction is employed to reconstruct an image.

Figure 2:
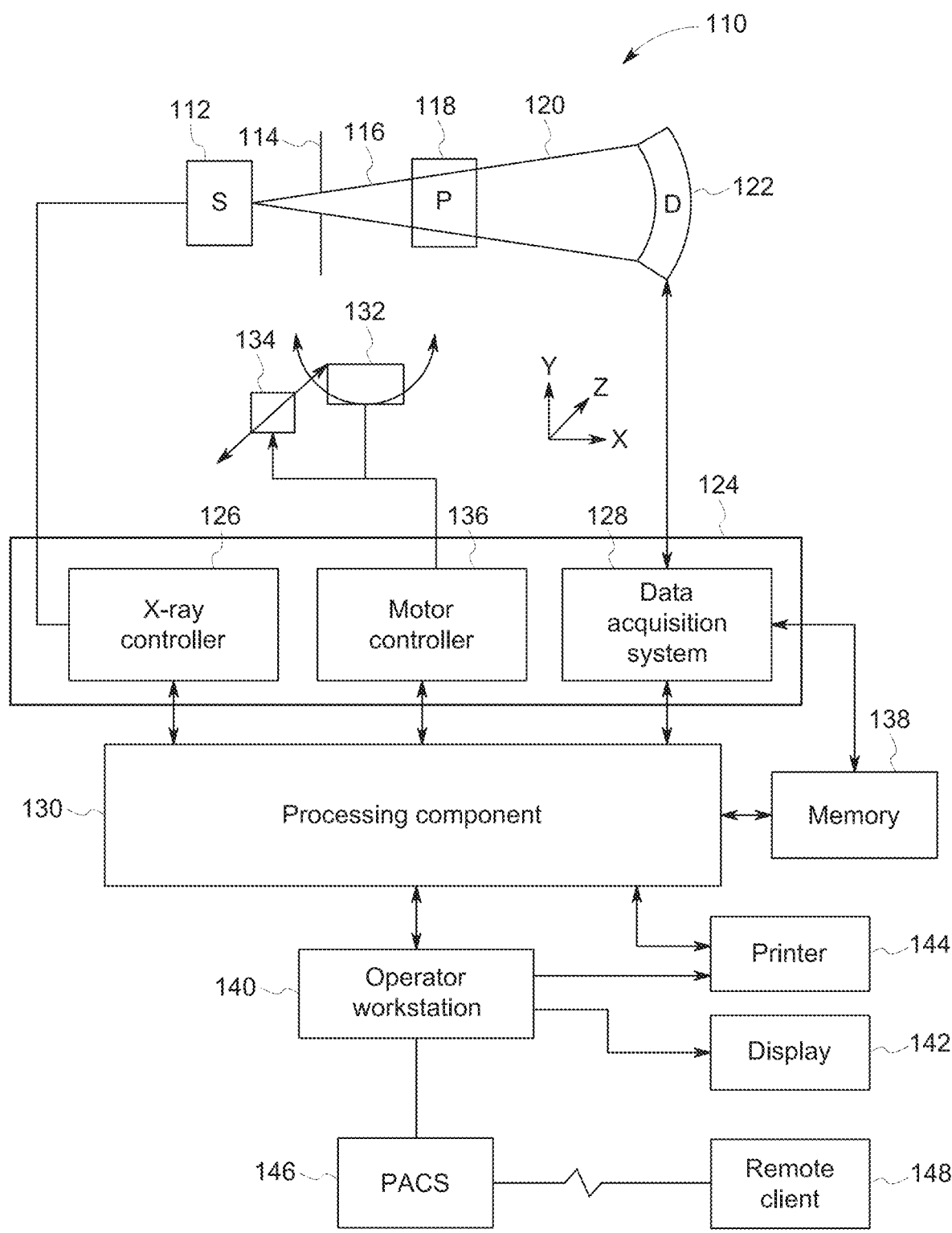
FIG. 2 is a block diagram depicting components of a computed tomography (CT) imaging system, in accordance with aspects of the present disclosure.

With this in mind, an example of an imaging system 110 (i.e., a scanner) is depicted in FIG. 2. In the depicted example, the imaging system 110 is a CT imaging system designed to acquire scan data (e.g., X-ray attenuation data) at a variety of views around a patient (or other subject or object of interest) and suitable for performing image reconstruction using tomographic reconstruction techniques. In the embodiment illustrated in FIG. 2, imaging system 110 includes a source of X-ray radiation 112 positioned adjacent to a collimator 114. The X-ray source 112 may be an X-ray tube, a distributed X-ray source (such as a solid-state or thermionic X-ray source) or any other source of X-ray radiation suitable for the acquisition of medical or other images. Conversely, in a PET or SPECT embodiments, a toroidal radiation detector may be provided and a radio-active tracer is used as a radiation source. In the case of MM, the measurements are samples in Fourier space and can either be applied directly as the input to the neural network or can first be converted to line integrals in sinogram space.

In the depicted example, the collimator 114 shapes or limits a beam of X-rays 116 that passes into a region in which a patient/object 118, is positioned. In the depicted example, the X-rays 116 are collimated to be a cone-shaped beam, i.e., a cone-beam, that passes through the imaged volume. A portion of the X-ray radiation 120 passes through or around the patient/object 118 (or other subject of interest) and impacts a detector array, represented generally at reference numeral 122. Detector elements of the array produce electrical signals that represent the intensity of the incident X-rays 120. These signals are acquired and processed to reconstruct images of the features within the patient/object 118.

Source 112 is controlled by a system controller 124, which furnishes both power, and control signals for CT examination sequences, including acquisition of two-dimensional localizer or scout images used to identify anatomy of interest within the patient/object for subsequent scan protocols. In the depicted embodiment, the system controller 124 controls the source 112 via an X-ray controller 126 which may be a component of the system controller 124. In such an embodiment, the X-ray controller 126 may be configured to provide power and timing signals to the X-ray source 112.

Moreover, the detector 122 is coupled to the system controller 124, which controls acquisition of the signals generated in the detector 122. In the depicted embodiment, the system controller 124 acquires the signals generated by the detector using a data acquisition system 128. The data acquisition system 128 receives data collected by readout electronics of the detector 122. The data acquisition system 128 may receive sampled analog signals from the detector 122 and convert the data to digital signals for subsequent processing by a processor 130 discussed below. Alternatively, in other embodiments the digital-to-analog conversion may be performed by circuitry provided on the detector 122 itself. The system controller 124 may also execute various signal processing and filtration functions with regard to the acquired image signals, such as for initial adjustment of dynamic ranges, interleaving of digital image data, and so forth.

In the embodiment illustrated in FIG. 2, system controller 124 is coupled to a rotational subsystem 132 and a linear positioning subsystem 134. The rotational subsystem 132 enables the X-ray source 112, collimator 114 and the detector 122 to be rotated one or multiple turns around the patient/object 118, such as rotated primarily in an x, y-plane about the patient. It should be noted that the rotational subsystem 132 might include a gantry or C-arm upon which the respective X-ray emission and detection components are disposed. Thus, in such an embodiment, the system controller 124 may be utilized to operate the gantry or C-arm.

The linear positioning subsystem 134 may enable the patient/object 118, or more specifically a table supporting the patient, to be displaced within the bore of the CT system 110, such as in the z-direction relative to rotation of the gantry. Thus, the table may be linearly moved (in a continuous or step-wise fashion) within the gantry to generate images of particular areas of the patient 118. In the depicted embodiment, the system controller 124 controls the movement of the rotational subsystem 132 and/or the linear positioning subsystem 134 via a motor controller 136.

In general, system controller 124 commands operation of the imaging system 110 (such as via the operation of the source 112, detector 122, and positioning systems described above) to execute examination protocols and to process acquired data. For example, the system controller 124, via the systems and controllers noted above, may rotate a gantry supporting the source 112 and detector 122 about a subject of interest so that X-ray attenuation data may be obtained at one or more views relative to the subject. In the present context, system controller 124 may also include signal processing circuitry, associated memory circuitry for storing programs and routines executed by the computer (such as routines for performing tomographic reconstruction techniques described herein), as well as configuration parameters, image data, and so forth.

In the depicted embodiment, the image signals acquired and processed by the system controller 124 are provided to a processing component 130 for reconstruction of images in accordance with the presently disclosed algorithms. The processing component 130 may be one or more general or application-specific microprocessors. The data collected by the data acquisition system 128 may be transmitted to the processing component 130 directly or after storage in a memory 138. Any type of memory suitable for storing data might be utilized by such an exemplary system 110. For example, the memory 138 may include one or more optical, magnetic, and/or solid state memory storage structures. Moreover, the memory 138 may be located at the acquisition system site and/or may include remote storage devices for storing data, processing parameters, and/or routines for tomographic image reconstruction, as described below.

The processing component 130 may be configured to receive commands and scanning parameters from an operator via an operator workstation 140, typically equipped with a keyboard and/or other input devices. An operator may control the system 110 via the operator workstation 140. Thus, the operator may observe the reconstructed images and/or otherwise operate the system 110 using the operator workstation 140. For example, a display 142 coupled to the operator workstation 140 may be utilized to observe the reconstructed images and to control imaging. Additionally, the images may also be printed by a printer 144 which may be coupled to the operator workstation 140.

Further, the processing component 130 and operator workstation 140 may be coupled to other output devices, which may include standard or special purpose computer monitors and associated processing circuitry. One or more operator workstations 140 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

It should be further noted that the operator workstation 140 may also be coupled to a picture archiving and communications system (PACS) 146. PACS 146 may in turn be coupled to a remote client 148, radiology department information system (RIS), hospital information system (HIS) or to an internal or external network, so that others at different locations may gain access to the raw or processed image data.

While the preceding discussion has treated the various exemplary components of the imaging system 110 separately, these various components may be provided within a common platform or in interconnected platforms. For example, the processing component 130, memory 138, and operator workstation 140 may be provided collectively as a general or special purpose computer or workstation configured to operate in accordance with the aspects of the present disclosure. In such embodiments, the general or special purpose computer may be provided as a separate component with respect to the data acquisition components of the system 110 or may be provided in a common platform with such components. Likewise, the system controller 124 may be provided as part of such a computer or workstation or as part of a separate system dedicated to image acquisition.

The system of FIG. 2 may be utilized to acquire X-ray projection data (or other scan data for other modalities) for a variety of views about a region of interest of a patient to reconstruct images of the imaged region using the scan data. Projection (or other) data acquired by a system such as the imaging system 110 may be reconstructed as discussed herein to perform a tomographic reconstruction.

With the preceding background and context discussion in mind, the present disclosure relates to an image reconstruction approach with favorable properties in terms of noise reduction, spatial resolution, detail preservation and computational complexity. The disclosed technique may include some or all of three different aspects: a first-pass reconstruction, a simplified datafit term, and an image-domain deep learning denoiser. In accordance with this approach, the simplicity of a direct reconstruction approach may be obtained along with the noise reduction capability of deep learning, with the statistical benefit of a data-fit term. In addition, in various implementations, the disclosed technique is easily portable to different CT platforms, such as by incorporating a first-pass reconstruction step, as discussed herein.

Figure 3:
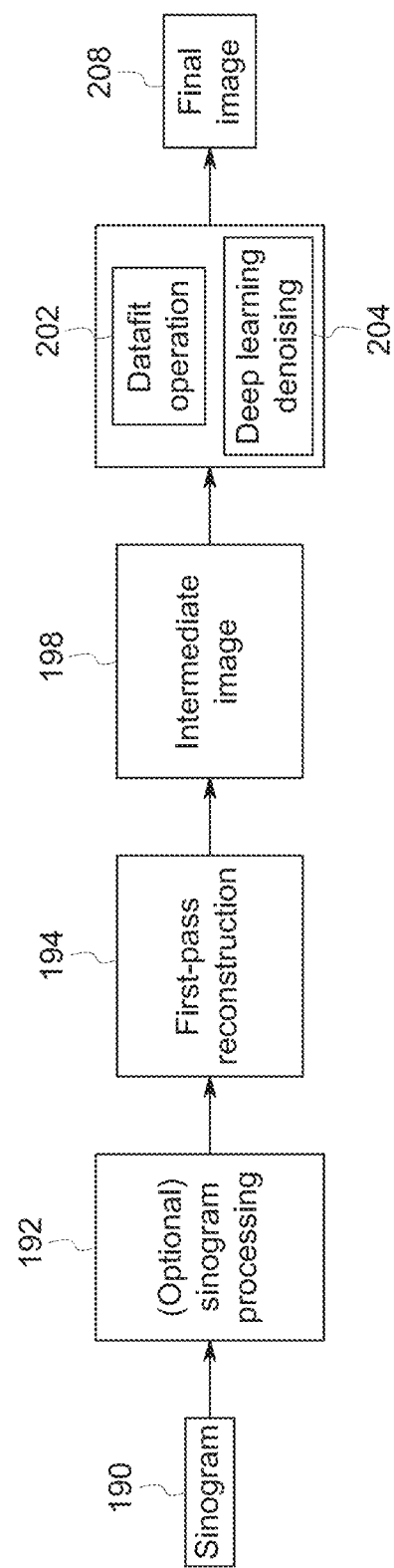
FIG. 3 depicts a generalized implementation of an image reconstruction process flow including a datafit operation and denoising, in accordance with aspects of the present disclosure.

By way of illustration, and turning to FIG. 3, in a generalized implementation, a measured sinogram 190 may first undergo various, optional pre-processing steps 192. For example, in a photon starvation context, sinogram processing may include removing or otherwise correcting for low signal artifacts present in the sinogram 190 that might result in artifacts that are more difficult to address in the image domain. Similarly, beam hardening correction or scatter correction may also be performed as part of the pre-processing step(s) 192.

A first-pass reconstruction 194 converts the sinogram 190 to an intermediate image 198 (or image volume), which is then used as the input to an iterative processing step, such as an iterative process including one or both of a datafit operation 202 and a deep learning denoising operation 204, to produce a final image 208. In the depicted example, the datafit and denoising operations are performed in parallel, but they may alternatively be performed in series.

As used herein, the datafit operation 202 or comparison is similar to the datafit operation performed in model-based iterative reconstruction (MBIR). However, unlike MBIR operations, the present datafit operations 202 and/or updates correspond to a comparison and update step performed on the output of the most recent iteration and an intermediate reconstruction or sinogram (e.g., intermediate image 198), as opposed to the original measured data. In practice, the datafit operation 202 helps retain spatial resolution by referring back to the image or data at an earlier state, here the initial intermediate image 198. The datafit operation 202 also allows statistical modeling to be applied and thereby improves both spatial resolution and statistical efficiency of the process.

In one embodiment, the first pass reconstruction 194 is an analytic reconstruction, such as a filtered backprojection (FBP) or, in one implementation, an information-preserving filtered-backprojection reconstruction (IPFBP). Filtered backprojection typically suppresses image noise for optimized image quality or task performance with human observers, although at the cost of losing spatial resolution or information relative the measured sinogram 190. With respect to IPFBP reconstructions as used herein, such reconstructions are a type of FBP reconstruction designed or configured to avoid or reduce resolution loss, i.e., to preserve information present in the measured sinogram 190. Compared to FBP, IPFBP may be have smaller voxel size (e.g., using a 1024×1024 or 2048×2048 image matrix as opposed to a 512×512 image matrix), a higher-pass kernel (e.g., amplifying certain or select frequencies in comparison to a standard ramp filter), and/or higher up-sampling ratio for filtering or backprojection of the sinogram (e.g., up-sampling the sinogram by a factor of 2 to 4 during filtering and backprojection). For example, the reconstruction kernel may be empirically defined to minimize the error between the reprojection of the FBP-reconstruction and the measured sinogram 190. Such an IPFBP reconstruction may be optimized for non-human analysis or processing (e.g., by a trained neural network) in a subsequent step, as opposed to direct review by a human reviewer.

Figure 4:
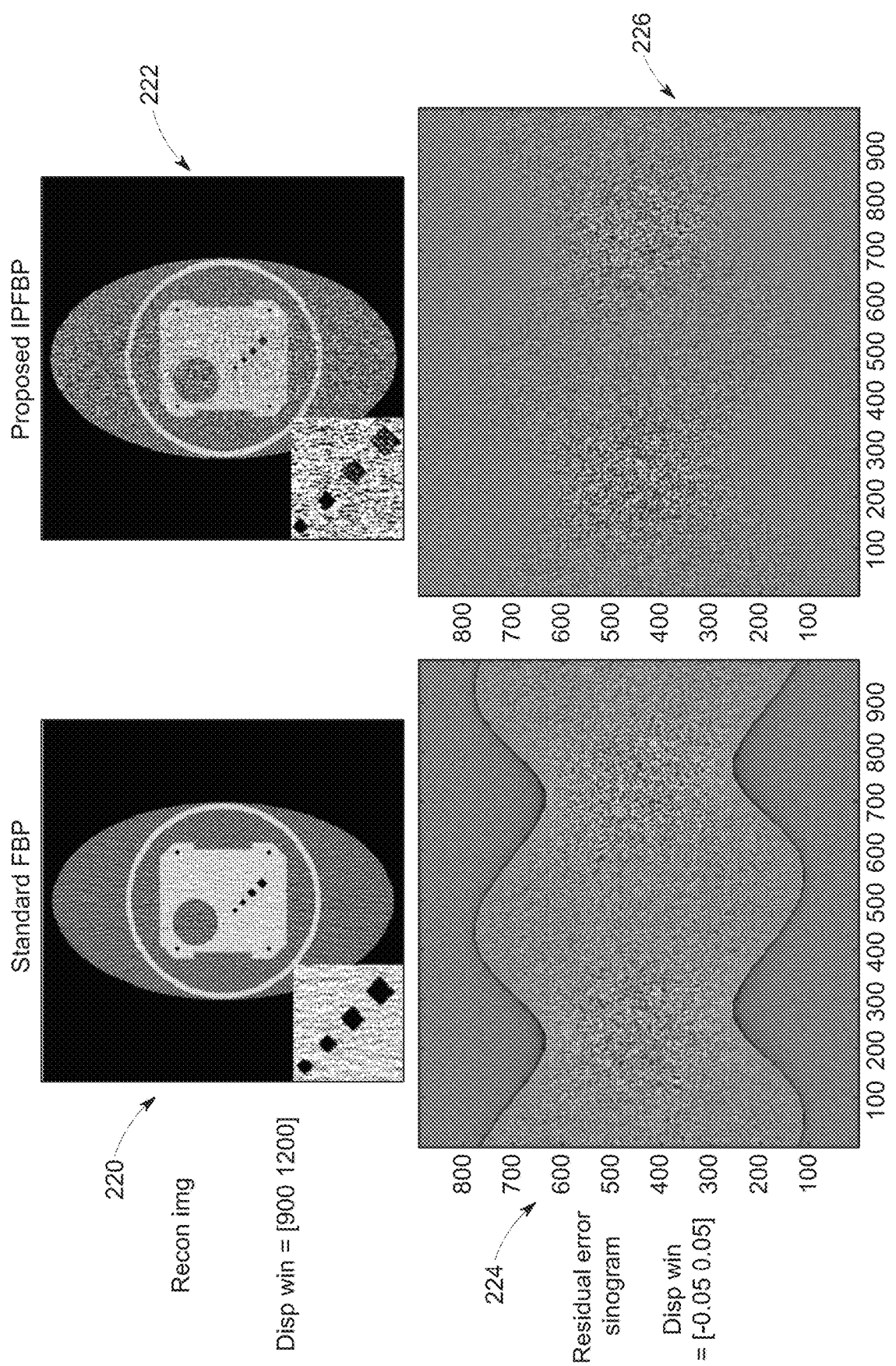
FIG. 4 depicts images reconstructed using conventional and information preserving filtered backprojection in conjunction with corresponding residual error sinograms, in accordance with aspects of the present disclosure.

By way of example, and turning to FIG. 4, a visual comparison is provided between images reconstructed by a standard FBP (left side) versus an IPFBP algorithm, which can be used as the first-pass reconstruction 194 as discussed herein. In the illustrated example, the standard FBP reconstruction was performed using a 512×512 reconstruction grid, a standard filter kernel, and no upsampling of the detector data before backprojection. In contrast, the IPFBP reconstruction used a 1024×1024 reconstruction grid, a high-resolution filter kernel (i.e., a higher-resolution filter kernel designed by minimizing the error between the reprojection of the FBP-reconstruction and the measured sinogram), and 4X upsampling of the detector data before backprojection. Although the depicted standard FBP image 220 has lower noise level and smoother appearance, the depicted IPFBP image 222 contains more information, as evidenced by the fine resolution features visible only in the IPFBP image. The respective residual error sinograms 224, 226 for each reconstruction are also depicted for comparison, which further illustrates the relative reduction in residual error obtained in the IPFBP reconstruction.

Figure 5:
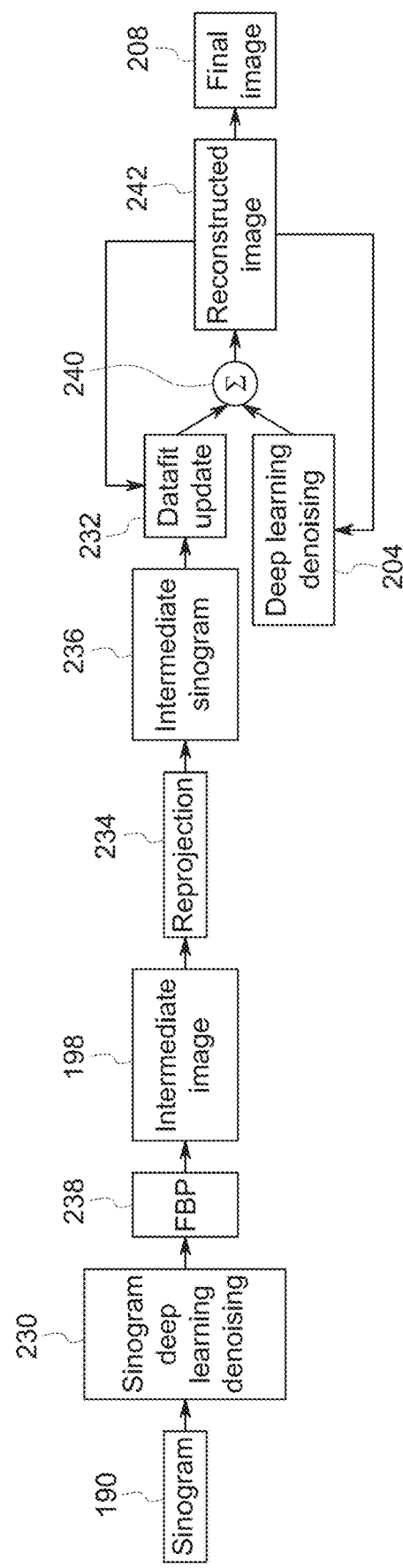
FIG. 5 depicts an implementation of an image reconstruction process flow including a datafit operation and denoising running in parallel within an iterative loop, in accordance with aspects of the present disclosure.
Figure 6:
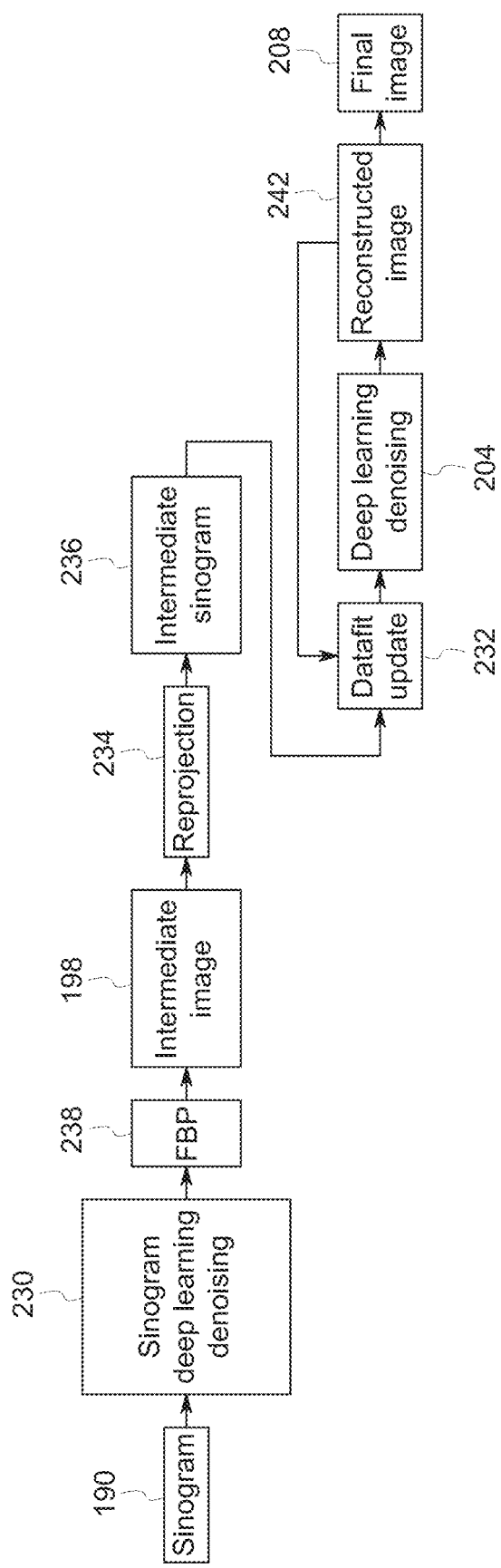
FIG. 6 depicts an implementation of an image reconstruction process flow including a datafit operation and denoising running in series within an iterative loop, in accordance with aspects of the present disclosure.
Figure 7:
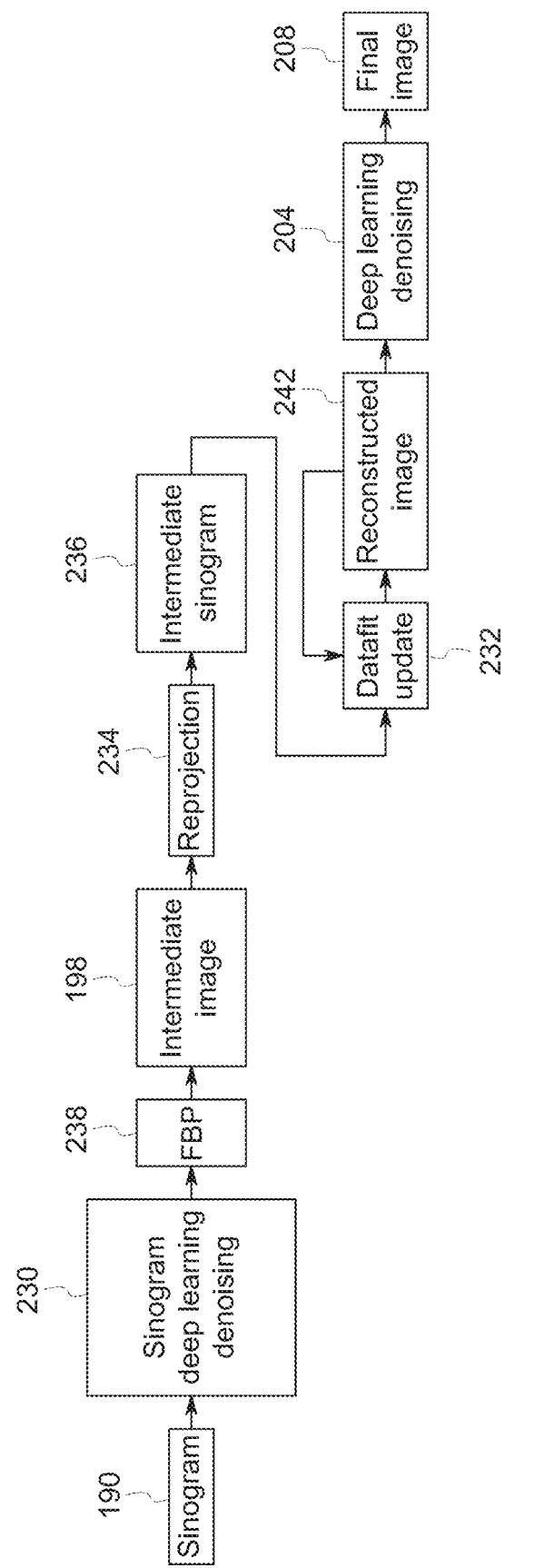
FIG. 7 depicts an implementation of an image reconstruction process flow including a datafit operation within an iterative loop and a separate denoising operation, in accordance with aspects of the present disclosure.

Turning to FIGS. 5, 6, and 7, In certain embodiments, the sinogram processing step 192 may be or may include a sinogram denoising step 230 (e.g., a deep learning sinogram denoising step performed using a trained neural network or convolutional neural network) distinct from the denoising step 204 performed in the image domain. Such a sinogram denoising step 230 performed in the projection domain could be applied primarily on a lowest-signal portion of the sinogram 190. This preferential application to such a low-signal portion of the sinogram 190 can be achieved either explicitly by a weighting function or implicitly by a deep learning denoising network.

As shown in FIGS. 5-7, in certain embodiments the datafit operation 202 may take the form of a datafit update 232 performed using a reprojection (reprojection step 234) of the first-pass reconstruction (i.e., the datafit term is based on an intermediate image 198 generated by filtered backprojection 238) to generate an intermediate sinogram 236. This intermediate sinogram 236 may then be employed as an input to an iterative reconstruction update step (i.e., the datafit update 232 with deep learning based denoising, which may serve as a regularization term to the iterative process), such as with corresponding statistical weights for optimal noise behavior.

In certain implementations, the reprojection operation 234 can be performed on different portions of the intermediate image 198 (i.e., limited portions of the intermediate image 198) at different steps or times for improved computational efficiency, e.g., by splitting the reprojection task into smaller pieces. The reprojection step 234 and may be simplified to a two-dimensional parallel-beam or fan-beam or fan-parallel-beam reprojection and a reduced number of views relative to the acquisition geometry and/or number of views used to acquire the original sinogram 190. The reprojection step 234 can also be performed with virtual source orbits and/or detector positions different than those actually employed to acquire the initial scan data (including virtual source orbits and/or detector positions that are not practical or possible with the physical source and detector installed on the scanner). In this manner, various benefits, including computational efficiency and image quality improvement, may be obtained. For example, the rotation axis of the source orbit can be offset or oblique relative to the physical rotation axis.

In various embodiments, the filtered backprojection 238 and intermediate image 198 can also be a simplified partial reconstruction, such as over a partial angular range (as opposed to a diagnostic quality or conventional resolution reconstruction), that is sufficient for the purpose of the subsequent reprojection step 234. For example, the intermediate image 198 can be a set of limited angle reconstructions that have larger pixel size along the corresponding direction of reprojection rays. In such an implementation, the computation cost of both the first-pass reconstruction (e.g., FBP 238) and the reprojection step 234 can be reduced. In various such embodiments, multiple intermediate images or intermediate sinograms that correspond to different projection angles can be generated.

FIGS. 5-7 differ in the manner in which the datafit operation (e.g., datafit update 232) and denoising operation (e.g., deep learning denoising 204) are coordinated. As may be appreciated, these operations may be performed and combined in various permutations, three examples of which are depicted in FIGS. 5-7. It should be understood, however, that other process flows and combinations of steps are contemplated and encompassed by the present discussion.

With respect to FIG. 5, in this example process flow the deep learning denoising operation 204 is combined (step 240) with the datafit update 232 in a parallel manner within an iterative loop such that each iteration of the loop generates a reconstructed image 242 that is input to the respective datafit update 232 and denoising operation 204 for the next iteration until a set number of iterations are performed or some other completion threshold (e.g., a cost function) is met, at which time the most recent reconstructed image 242 is the final image 208.

Turning to FIG. 6, in this example process flow the deep learning denoising operation 204 is combined (step 240) with the datafit update 232 in a sequential manner within the iterative loop such that the corresponding reconstructed image 242 generated by a respective iteration is input to the respective datafit update 232 for the next iteration until a set number of iterations are performed or some other completion threshold (e.g., a cost function) is met, at which time the most recent reconstructed image 242 is the final image 208.

Lastly, turning to FIG. 7, in this example process flow the deep learning denoising operation 204 is performed outside of the iterative loop on the final reconstructed image 242 to generate the final image 208. In this example, the corresponding reconstructed image 242 generated by a respective iteration is input to the respective datafit operation 232 for the next iteration until a set number of iterations are performed or some other completion threshold (e.g., a cost function) is met. The resulting reconstructed image 242 is output from the iterative update process and subjected to denoising 204 to generate the final image 208.

Figure 8:
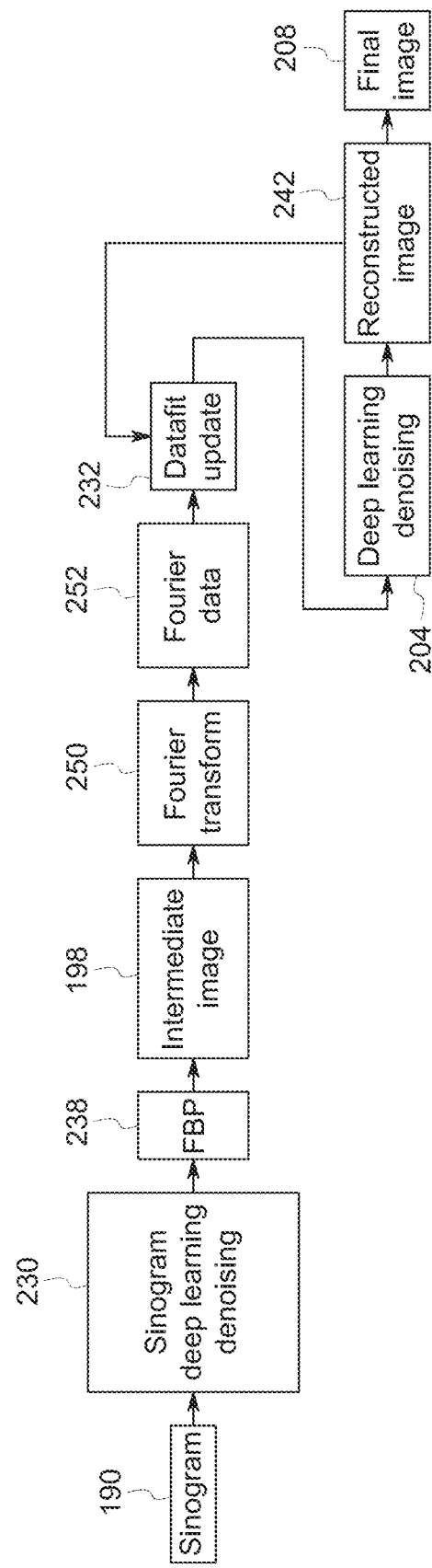
FIG. 8 depicts an implementation of an image reconstruction process flow including Fourier-domain data and including a datafit operation and denoising running in series within an iterative loop, in accordance with aspects of the present disclosure.

In other embodiments, the datafit term (e.g., datafit update 232) may be based on image transforms of the intermediate image 198. By way of example, and as shown in FIG. 8, the datafit update 232 of an iterative process may be based on a (local) Fourier transform 250 (yielding Fourier data 252) of a first-pass reconstruction (e.g., FBP 238). In such an example, the datafit term can include Fourier-based weighting. The Fourier transform (e.g., a fast Fourier transform (FFT)) of the reconstructed image 242 of a given iteration loop is returned as Fourier data to the datafit update step 232 until the iterations are completed. As may be appreciated, other image transforms, such as wavelet frames, may also be used as the datafit term.

The process flow example illustrated in FIG. 8 corresponds to the sequential flow illustrated in FIG. 6. As may be appreciated, however, the deep learning denoising step 204 in this example can be applied in different configurations, including the parallel and outside-the-iterative-loop example process flows illustrated in FIGS. 5 and 7, as well as other suitable process flow configurations.

Figure 9:
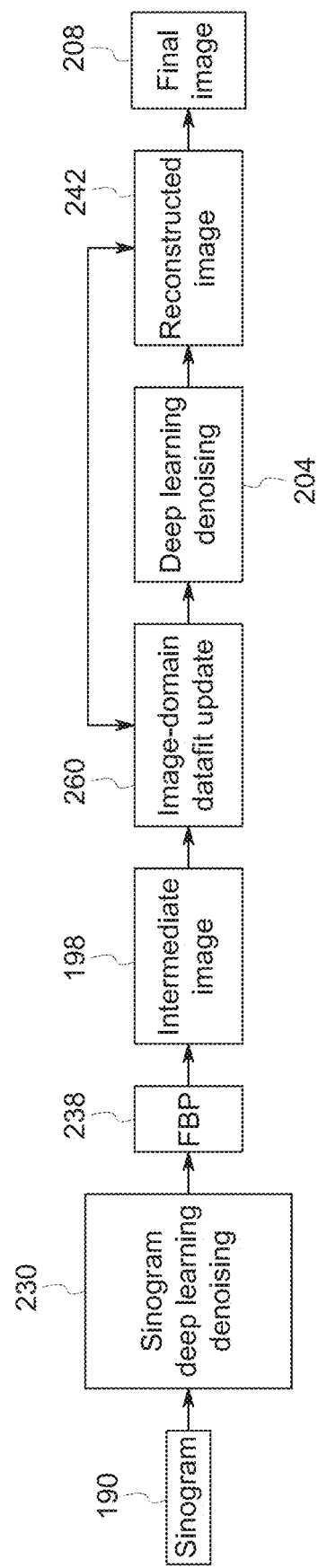
FIG. 9 depicts an implementation of an image reconstruction process flow including a datafit operation and denoising running in series within an iterative loop operating in the image-domain, in accordance with aspects of the present disclosure.

In another embodiment, an example of which is depicted in FIG. 9, the datafit term is based directly on the first-pass reconstruction (e.g., an intermediate image 198 generated from a filtered backprojection 238). As such, the datafit term is in the image domain (i.e., an image domain datafit update 260). The datafit term can include a spatial correlation term to account for correlated noise. The reconstructed image 242 of a given iteration loop is used as an input to the image-domain datafit update step 260 until the iterations are completed. In various such embodiments, the datafit term can also include multiple intermediate images, e.g., images that correspond to different projection angles.

As in the preceding example, the process flow example illustrated in FIG. 9 corresponds to the sequential flow illustrated in FIG. 6. As may be appreciated, however, the deep learning denoising step 204 in this example can be applied in different configurations, including the parallel and outside-the-iterative-loop example process flows illustrated in FIGS. 5 and 7, as well as other suitable process flow configurations.

Figure 10:
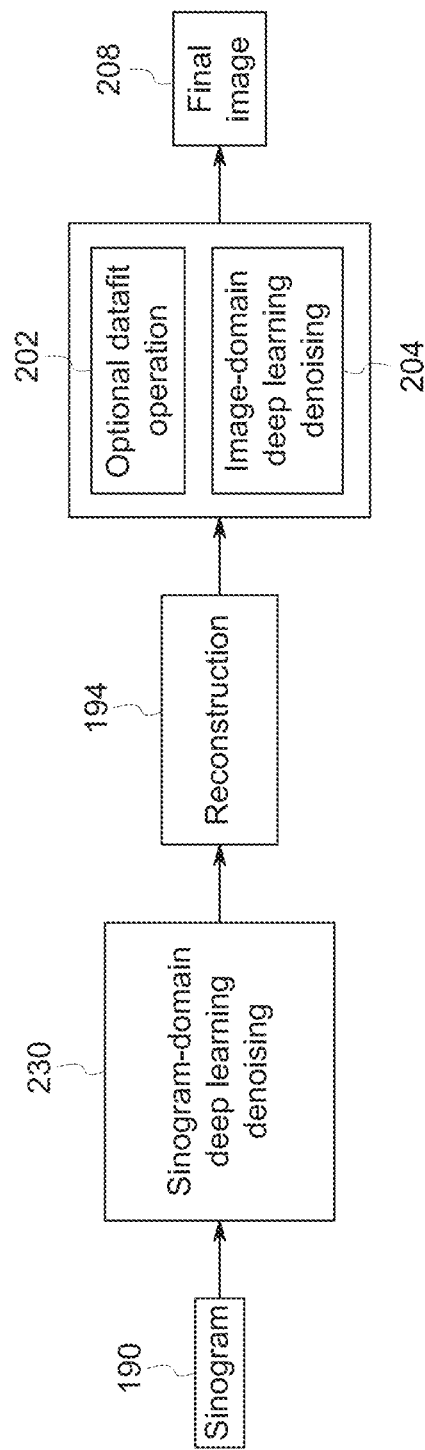
FIG. 10 depicts a generalized implementation of an image reconstruction process flow including a datafit operation and denoising, in accordance with aspects of the present disclosure.
Figure 11:
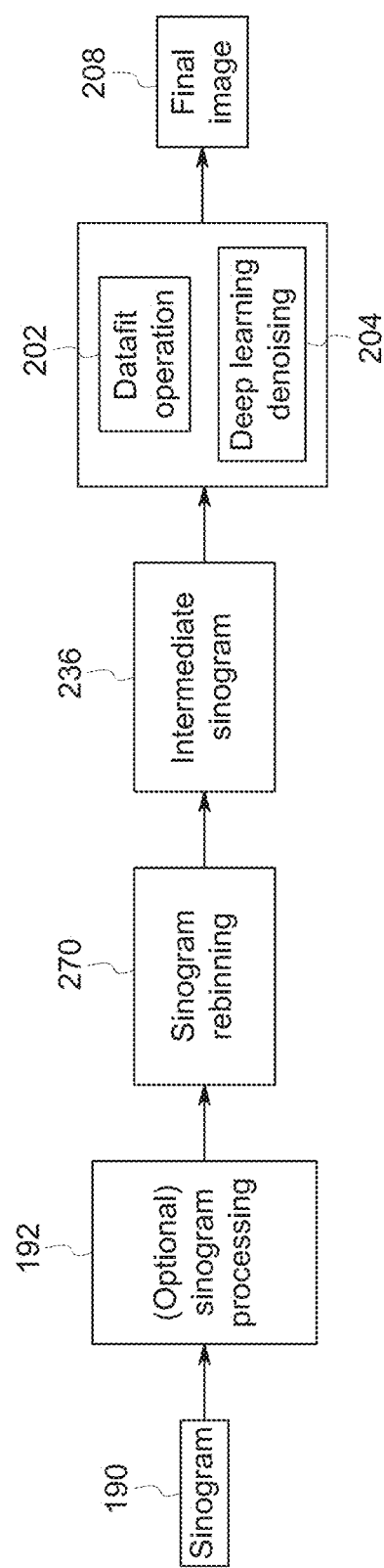
FIG. 11 depicts a generalized implementation of an image reconstruction process flow including a sinogram rebinning operation and including a datafit operation and denoising, in accordance with aspects of the present disclosure.

Other variations and modifications of aspects of the approaches discussed above are illustrated in the process flows of FIGS. 10 and 11. By way of example, FIG. 10 depicts a process flow that includes sinogram deep learning denoising 230 of a sinogram 190 followed by a reconstruction step 194, such as FBP or IPFBP. The result of the reconstruction step 194 (i.e., an image) may undergo deep learning denoising 204 in the image domain to generate a final image 208. An optional datafit operation 202 can also be applied in conjunction with the deep learning denoising 204, after the first-pass reconstruction 194, as part of the depicted process flow.

In yet another embodiment, illustrated in FIG. 11, the first-pass reconstruction step 194 and the intermediate reconstructed image 198, as shown in FIG. 3, are omitted. Instead, an intermediate sinogram 236 is generated directly from the pre-processed sinogram 190 by sinogram rebinning 270. The intermediate sinogram 236 can be generated by rebinning in various ways, such as by application of simplified, modified, or virtual projection geometries. Alternatively, new sinogram data for use in the intermediate sinogram 236 can be generated according to a consistency condition and/or through application of deep learning approaches (e.g., a trained neural network). Such approaches can be done for various computational or image quality benefits. As in the preceding example, the datafit and image-domain denoising operations can be applied in sequence, in parallel, with the denoising occurring outside-the-iterative-loop.

It may also be appreciated that in existing image reconstruction methods, image processing methods, and certain implementations some or all of the different methods and process flows described herein can be run in parallel and the output images (i.e., the respective final images 208 generated by the different, parallel processes) can be combined by a deep learning network (e.g., a trained neural network) for selection of the best image for a given diagnostic purpose, for combination into a an aggregate or weighted image, and/or for processing into a further improved image. Such a parallel processing approach (i.e., running different processes in parallel that generate a different but comparable output) with subsequent generation or selection of a single, final image may be referred to as "bagging" and may be useful for combining the advantages and avoiding or reducing the disadvantages of the respective individual techniques.

With the preceding in mind, FIGS. 12-15 depict reconstructed images (here clinical CT scans of a pelvis) corresponding to different operations discussed and described herein to facilitate comparison of the effects of the operations alone and in combination. For example, FIG. 12 corresponds to a reconstructed image generated using a standard filtered backprojection (FBP) algorithm, which may thus correspond to a first-pass reconstruction as used herein. This image was generated by applying a filtered backprojection to a measured sinogram with no denoising in either the projection or image domains.

Figure 12:
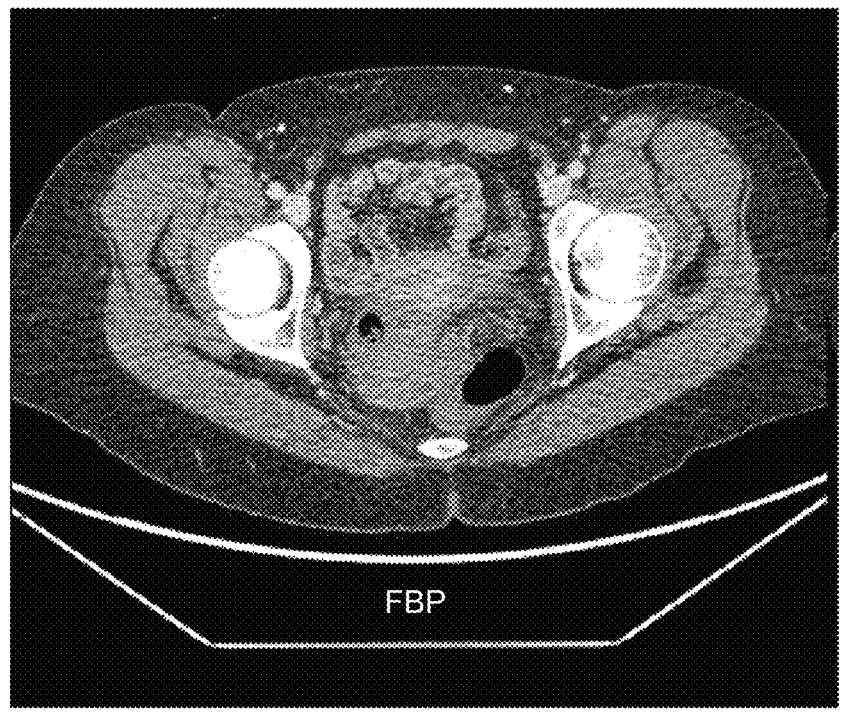
FIG. 12 depicts an example of an image reconstructed using filtered backprojection, in accordance with aspects of the present disclosure.
Figure 13:
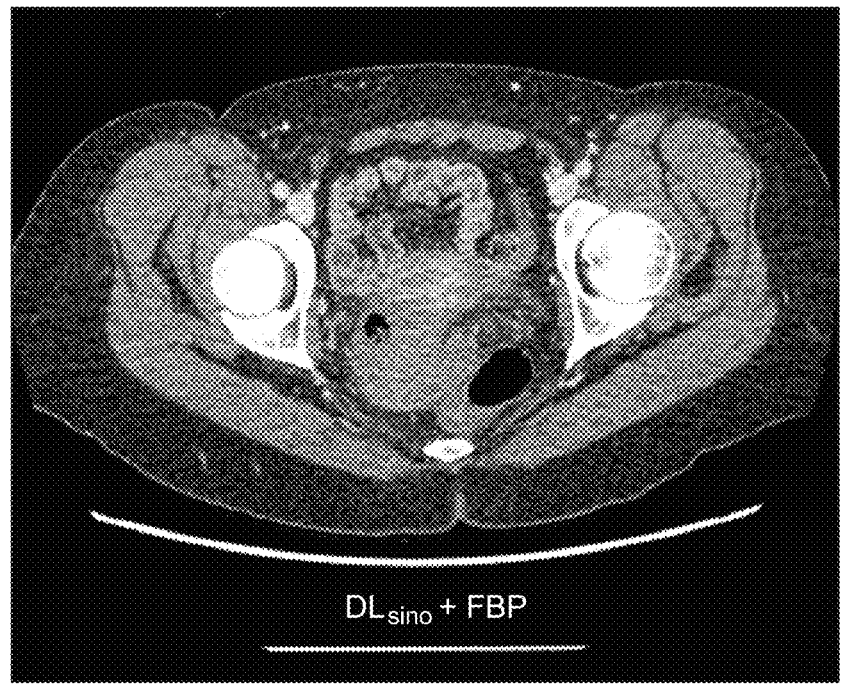
FIG. 13 depicts an example of an image reconstructed using filtered backprojection and sinogram-domain denoising, in accordance with aspects of the present disclosure.

FIG. 13 illustrates a filtered backprojection reconstruction of the same measured sinogram data as FIG. 12. However, in this example a sinogram-domain (i.e., projection space) deep learning denoising operation was performed prior to the FBP operation. In this example and the following examples, the sinogram-domain (i.e., projection space) deep learning denoising operation was implemented as an 8-layer fully-connected network with interlayer connections.

Figure 14:
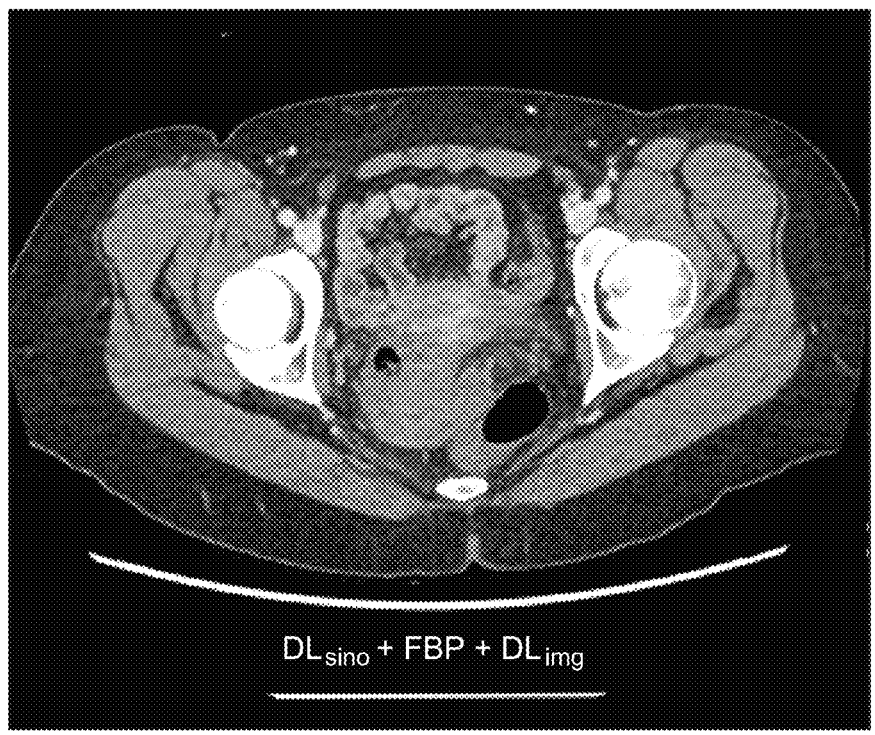
FIG. 14 depicts an example of an image reconstructed using filtered backprojection, sinogram-domain denoising, and image-domain denoising, in accordance with aspects of the present disclosure.

FIG. 14 builds upon this sequence of operations exemplified in FIG. 13 by adding an image-domain (i.e., image space) deep learning denoising operation performed subsequent to the FBP operation. In this example and the following example, the image-domain deep learning denoising operation was implemented as an 8-layer contracting path-based convolutional encoder-decoder.

Figure 15:
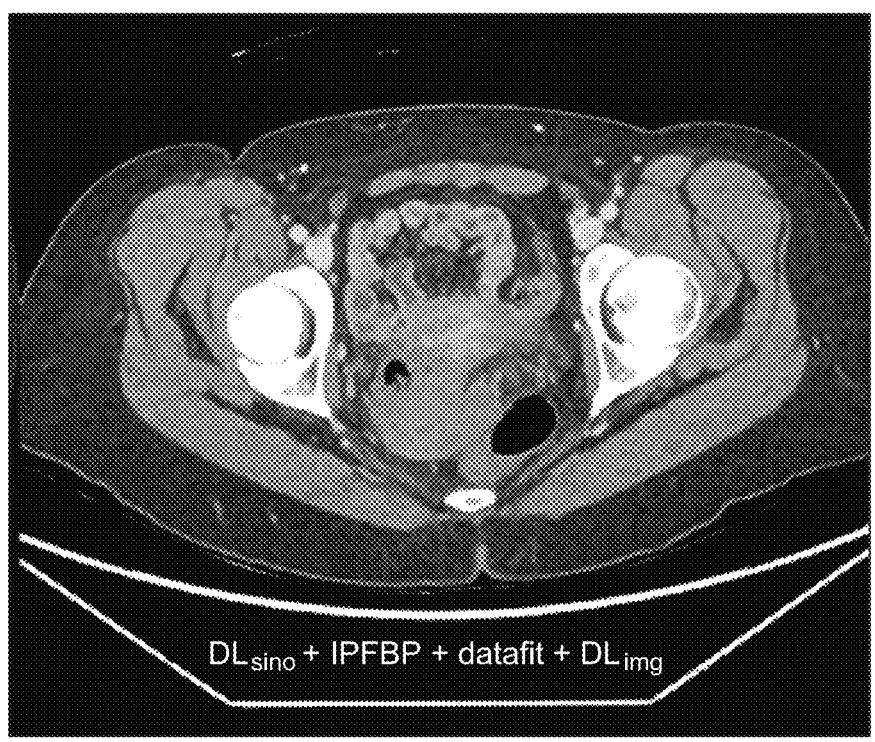
FIG. 15 depicts an example of an image reconstructed using information preserving filtered backprojection, sinogram-domain denoising, image-domain denoising, and a datafit operation, in accordance with aspects of the present disclosure.

In addition to the projection- and image-domain denoising, FIG. 15 depicts an image reconstruction with two additional variations. In place of the conventional FBP, the first pass reconstruction is instead performed using an information-preserving filtered-backprojection (IPFBP) algorithm, as discussed herein. In addition, a datafit term (implemented using a datafit update as discussed herein) was employed this example, for image-domain denoising. The combined $DL_{sino}$+IPFBP+datafit+$DL_{img}$ algorithm used to generate FIG. 15 was implemented in accordance with the process flow illustrated in FIG. 7.

Technical effects of the invention include image reconstruction with favorable properties in terms of noise reduction, spatial resolution, detail preservation and computational complexity. The disclosed techniques may include some or all of: a first-pass reconstruction, a simplified datafit term, and/or a deep learning denoiser. In various implementations, the present disclosure is portable to different CT platforms, such as by incorporating a first-pass reconstruction step.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for reconstructing an image, comprising:
receiving a sinogram input;
performing a first denoising operation on the sinogram input without reconstructing the sinogram input using a first trained artificial neural network;
generating one or multiple intermediate sinogram(s) from the sinogram input or from one or multiple intermediate image(s) generated from the sinogram input;
iteratively processing the intermediate sinogram(s), wherein the iterative processing comprises performing at least an iterative datafit operation comparing an output of an iterative loop with an input to the iterative loop;
performing a second denoising operation on the intermediate sinogram(s) in addition to the datafit operation, wherein the second denoising operation is performed using a second trained artificial neural network, and wherein the datafit operation and the second denoising operation are combined within the iterative loop; and
upon completion of the iterative processing, reconstructing a final image and outputting the final image for review, storage, or further processing.

2. The method of claim 1, further comprising:
performing an initial reconstruction on the sinogram input to generate the one or more intermediate images; and
reprojecting all or a portion of the one or more intermediate images to generate the one or more intermediate sinograms.

3. The method of claim 2, wherein the initial reconstruction is a filtered backprojection or an information preserving filtered backprojection.

4. The method of claim 1, further comprising:
rebinning the sinogram input to generate the one or more intermediate sinograms.

5. The method of claim 1, wherein the additional denoising operation is performed primarily on a lowest-signal portion of the sinogram input.

6. A method for reconstructing an image, comprising:
receiving a sinogram input;
performing a first denoising on the sinogram input without reconstructing the sinogram input using a first trained artificial neural network;
performing an initial reconstruction or multiple partial reconstructions of the sinogram input to generate one or more intermediate image;
iteratively processing the one or more intermediate images or a transform of the one or more intermediate images, wherein the iterative processing comprises performing at least an iterative datafit operation comparing an output of an iterative loop with an input to the iterative loop;

performing a second denoising operation on the one or more intermediate images in addition to the datafit operation, wherein the second denoising operation is performed using a second trained artificial neural network, and wherein the datafit operation and the second denoising operation are combined within the iterative loop; and upon completion of the iterative processing, reconstructing a final image and outputting the final image for review, storage, or further processing.

7. The method of claim 6, further comprising:

performing a Fourier transform of the one or more intermediate images to generate the transform.

8. The method of claim 6, wherein the datafit operation and the second denoising operation are iteratively performed using the one or more intermediate images as input.

9. The method of claim 8, wherein the initial reconstruction is a filtered backprojection or an information preserving filtered backprojection.

10. A method for reconstructing an image, comprising:

receiving a sinogram input;

performing a first denoising operation on the sinogram input without reconstructing the sinogram input using a first trained artificial neural network;

reconstructing the sinogram input to generate one or more reconstructed images;

performing a second denoising operation in the image domain using a second trained artificial neural network;

iteratively processing the one or more reconstructed images or one or more intermediate sinograms generated from the one or more reconstructed images, wherein the iterative processing comprises performing at least an iterative datafit operation comparing an output of an iterative loop with an input to the iterative loop, wherein the datafit operation and the second denoising operation are combined within the iterative loop; and upon completion of the iterative processing, outputting a final image for review, storage, or further processing.

11. The method of claim 10, wherein the second denoising operation is performed on the one or more reconstructed images.

12. The method of claim 10, wherein reconstructing the sinogram input comprises performing a filtered backprojection or an information preserving filtered backprojection.

* * * * *